US012088338B2

(12) United States Patent
Jiang

(10) Patent No.: US 12,088,338 B2
(45) Date of Patent: Sep. 10, 2024

(54) METHOD AND SYSTEM FOR IMPROVING PERFORMANCE IN AN OPTICAL LINK

(71) Applicant: Huawei Technologies Canada Co., Ltd., Kanata (CA)

(72) Inventor: Zhiping Jiang, Kanata (CA)

(73) Assignee: Huawei Technologies Canada Co., Ltd., Kanata (CA)

(*) Notice: Subject to any disclaimer, the term of this patent is extended or adjusted under 35 U.S.C. 154(b) by 137 days.

(21) Appl. No.: 17/952,042

(22) Filed: Sep. 23, 2022

(65) Prior Publication Data

US 2024/0106534 A1 Mar. 28, 2024

(51) Int. Cl.
H04B 10/079 (2013.01)
H04B 10/293 (2013.01)
H04B 10/564 (2013.01)

(52) U.S. Cl.
CPC . H04B 10/07953 (2013.01); H04B 10/07955 (2013.01); H04B 10/293 (2013.01); H04B 10/564 (2013.01)

(58) Field of Classification Search
CPC ........ H04B 10/07953; H04B 10/07955; H04B 10/293; H04B 10/564
USPC ............... 398/26, 38, 94, 193, 197
See application file for complete search history.

(56) References Cited

U.S. PATENT DOCUMENTS

| | | | |
|---|---|---|---|
| 6,229,631 B1 | 5/2001 | Sato et al. | |
| 2002/0101637 A1* | 8/2002 | Li | H04J 14/0221 398/83 |
| 2003/0002098 A1* | 1/2003 | Carrick | H04J 14/0221 398/5 |
| 2004/0131355 A1* | 7/2004 | Takeshita | H04B 10/0795 398/33 |
| 2013/0028597 A1* | 1/2013 | Ye | H04B 10/07953 398/26 |
| 2016/0315712 A1* | 10/2016 | Vassilieva | H04J 14/021 |
| 2018/0343078 A1 | 11/2018 | Roberts et al. | |
| 2019/0215073 A1* | 7/2019 | Schmogrow | H04J 14/0271 |
| 2022/0329318 A1* | 10/2022 | Mehta | H04J 14/0254 |

OTHER PUBLICATIONS

Poggiolini et al., The GN-Model of Fiber Non-Linear Propagation and its Applications, Journal of Lightwave Technology, vol. 32, No. 4, Feb. 15, 2014, pp. 694-721.

* cited by examiner

*Primary Examiner* — Li Liu
(74) *Attorney, Agent, or Firm* — BCF LLP

(57) ABSTRACT

System and method for improving performance in an optical link. The optical link includes a plurality of communication channels for transmitting an optical signal. The method is performed by a link controller of the optical link. The method comprises determining a noise level of at least one channel of the plurality of channels, determining a launch power offset for the at least one channel and performing link commissioning based at least in part on the launch power offset.

16 Claims, 8 Drawing Sheets

METHOD AND SYSTEM FOR IMPROVING PERFORMANCE IN AN OPTICAL LINK

CROSS-REFERENCE TO RELATED APPLICATIONS

This is the first application filed for the instantly disclosed technology.

FIELD OF THE TECHNOLOGY

The present disclosure generally relates to the field of optical communications and, in particular, to methods and systems for improving performance in an optical link.

BACKGROUND

Typical implementation of optical networks, such as, for example, dense wavelength division multiplex (DWDM) networks, involves an enormous number of optical devices and optical communication lines making standard monitoring systems inefficient. Moreover, during propagation of an optical signal along an optical link or any optical communication line including a plurality of communication channels between a transmitting device and a receiving device, various impairments may appear such as self-phase modulation effect, or even cross-phase modulation effect occurring between a plurality of channels of the optical link. In coherent optical communication systems, the fiber nonlinear interference (NLI) is one of the most important impairments.

At the receiving device, a total accumulated amount of those impairments may increase a noise level of the received optical signal. Modern coherent transceivers usually have powerful digital signal processing capability such that linear impairments (e.g. chromatic dispersion) can be compensated by at the receiving device. Dispersion uncompensated links are dominantly used for their relatively low cost, relatively higher Optical Signal-to-Noise Ratio (OSNR) and/or relatively low fiber nonlinearity.

The performance of the optical link is usually limited by its worst performing channel (i.e. the one with a highest noise value in the received optical signal). As such, the maximum transmission capability of the optical link is determined by the worst performing channel. Typical solutions for enhancing performance of an optical link usually include equalizing the ONSR, or generalized ONSR (gOSNR), of every channel of the optical link. Said equalization can be described as a channel equalization. However, these solutions do not take into account differences between the worst performance channel and other channels of the optical link.

Therefore, there remains an interest in being able to improve communication performance of the optical link compared solutions found in the prior art that rely on channel equalization.

SUMMARY

An aspect of the present disclosure is to provide a method for improving performance in an optical transport network (OTN) link, the optical link comprising a plurality of communication channels for transmitting an optical signal, the method being performed by a link controller of the optical link. The method comprises determining a noise level of at least one channel of the plurality of channels, determining a launch power offset for the at least one channel and performing link commissioning based at least in part on the launch power offset.

In at least some embodiments of the method, determining noise of at least one channel comprises determining, for each channel, a present Optical Signal-to-Noise Ratio and a desired Optical Signal-to-Noise Ratio.

In at least some embodiments of the method, determining the present generalized Optical Signal-to-Noise Ratio is based on self-phase modulation (SPM) and cross-phase modulation (XPM) effects.

In at least some embodiments of the method, determining the launch power offset comprises determining a noise ratio ($\beta$), where:

$$\beta = \frac{SPM}{(SPM + XPM)},$$

wherein SPM a self-phase modulation (SPM) noise value and XPM is a cross-phase modulation (XPM) noise value.

In at least some embodiments of the method, determining a launch power offset for the at least one channel comprises:

$$\gamma = \beta^{-1/2},$$

wherein $\gamma$ is the launch power offset.

In at least some embodiments of the method, the optical link comprises at least one Wavelength Selective Switches (WSS) having a corresponding attenuation function applied to the optical signal, and performing link commissioning comprises adjusting the attenuation function of the at least one WSS such that an optical power of the optical signal in the at least one channel is offset by the launch power offset.

In at least some embodiments of the method, adjusting an attenuation function of the at least one WSS comprises changing a value of an optical loss corresponding to the at least one channel.

In at least some embodiments of the method, the at least one channel comprises a plurality of channels and adjusting an attenuation function of the at least one WSS comprises augmenting a value of an optical loss corresponding to the at least one channel and/or reducing a value of optical losses corresponding to the channels of the plurality of channels.

In at least some embodiments of the method, the method further comprises reinitiating a propagation of the optical signal in the at least one channel.

In at least some embodiments of the method, determining the at least one channel comprises determining one or more channels having a respective noise value above a predetermined threshold and identifying the one or more channels as the at least one channel.

In a second broad aspect of the present technology, there is provided a system for improving performance in an optical transport network (OTN) link, the optical link comprising a plurality of communication channels for transmitting an optical signal, the system comprising link controller operably connected to the optical link. The link controller is configured to determine a noise level of at least one channel of the plurality of channels, determine a launch power offset for the at least one channel and perform link commissioning based at least in part on the launch power offset.

In at least some embodiments of the system, the link controller is further configured to, in order to determine noise of at least one channel determine, for each channel, a present Optical Signal-to-Noise Ratio and a desired Optical Signal-to-Noise Ratio.

In at least some embodiments of the system, the link controller is further configured to, in order to determine the present Optical Signal-to-Noise Ratio, determine self-phase modulation (SPM) and cross-phase modulation (XPM) effects.

In at least some embodiments of the system, the link controller is further configured to, in order to determine the launch power offset, determine a noise ratio (β):

$$\beta = \frac{SPM}{(SPM + XPM)},$$

wherein SPM is a self-phase modulation (SPM) noise value and XPM is a cross phase modulation (XPM) noise value.

In at least some embodiments of the system, the link controller is further configured to, in order to determine a launch power offset for the at least one channel, determine:

$$\gamma = \beta^{-1/2},$$

wherein γ is the launch power offset.

In at least some embodiments of the system, the optical link comprises at least one Wavelength Selective Switches (WSS) having a corresponding attenuation function applied to the optical signal, and the link controller performs link commissioning by adjusting the attenuation function of the at least one WSS such that an optical power of optical signal in the at least one channel is offset by the launch power offset.

In at least some embodiments of the system, the link controller adjusts an attenuation function of the at least one WSS by changing a value of an optical loss corresponding to the at least one channel.

In at least some embodiments of the system, the at least one channel comprises a plurality of channels and the link controller adjusts an attenuation function of the at least one WSS by augmenting a value of a loss corresponding to the at least one channel and/or reducing the values of losses corresponding to the channels of the plurality of channels.

In at least some embodiments of the system, the link controller is further configured to reinitiate a propagation of the optical signal in the at least one channel.

In at least some embodiments of the system, the link controller determines the at least one channel by determining one or more channels having a respective noise value above a pre-determined threshold and identifying the one or more channels as the at least one channel.

BRIEF DESCRIPTION OF THE FIGURES

The features and advantages of the present disclosure will become apparent from the following detailed description, taken in combination with the appended drawings, in which.

Figure 1:
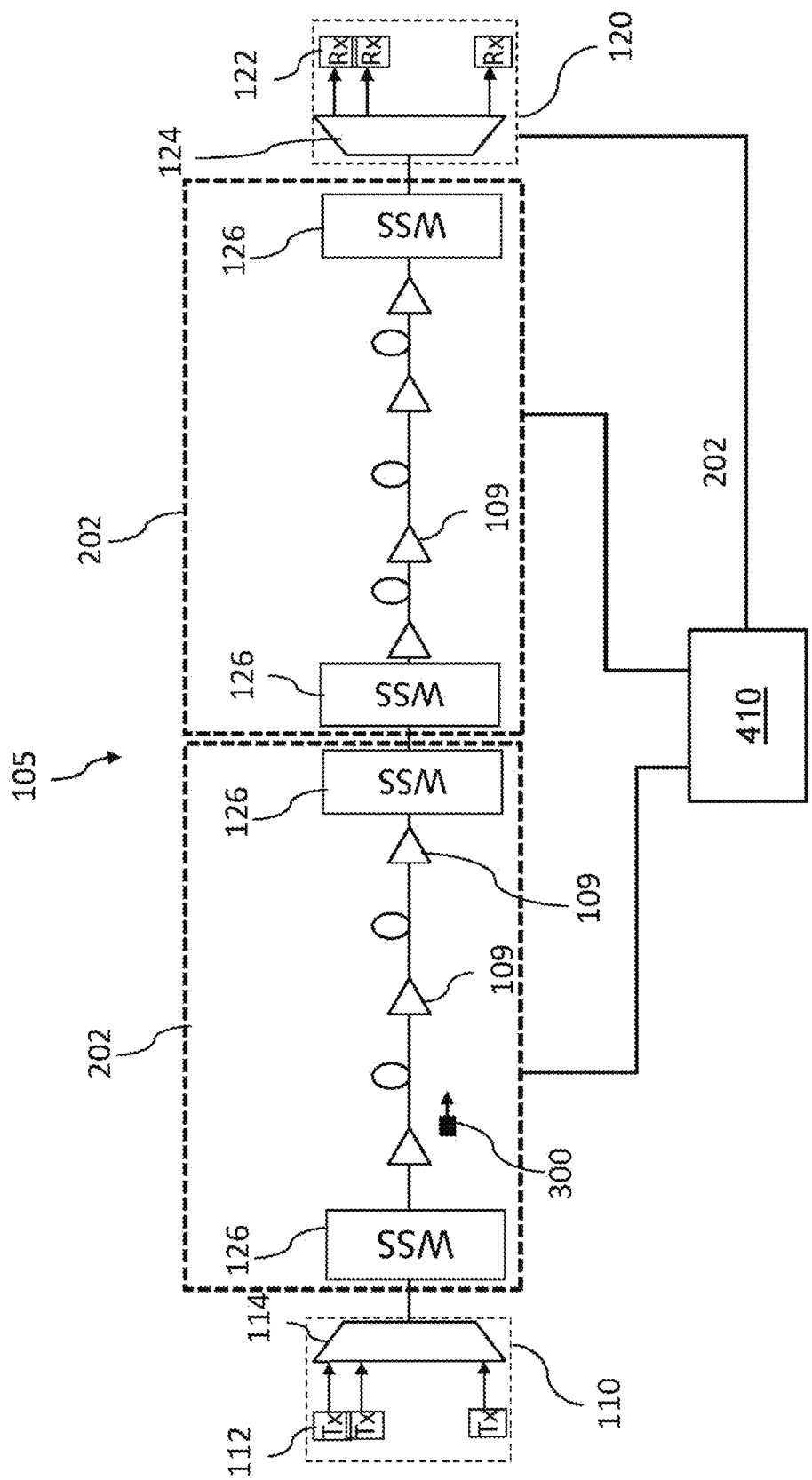
FIG. 1 is a high-level diagram of an optical link in accordance with some embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

Broadly speaking, the present technology provides a system and a method for improving performance of an optical transport network (OTN) link. As such, any system variation configured to enhance, increase or improve performance of an optical communication line can be adapted to execute embodiments of the present technology, once teachings presented herein are appreciated. Embodiments of the present technology can be equally applied to other types of the structure and other types of objects to improve performance thereof. In the context of the present disclosure, the performance of the optical link is a communication performance, that relates to a level of noise that affects the optical signal upon being carried by the optical link. The higher is an optical signal-to-noise ratio (OSNR), the higher is the performance of the optical link.

With these fundamentals in place, we will now consider some non-limiting examples to illustrate various implementations of aspects of the present disclosure.

FIG. 1 is a schematic of an optical link 105 in accordance with one embodiment of the present technology. The optical link 105 communicably connects a transmitting device 110 to a receiving device 120 for transmitting an optical signal 300 therebetween. The optical link 105 may include a conventional optical fiber such as, for example, a glass fiber surrounded by one or more coating layers. The optical link 105 may include an optical fiber core which transmits the optical signal 300, and an optical cladding, which confines the optical signal within the optical fiber core. It is also contemplated that light emitted by the transmitting device 110, thereby defining the optical signal 300, may be single polarized, dual polarized, or randomly polarized, may have a particular polarization (e.g. linearly polarized, elliptically polarized, or circularly polarized). In this implementation, a wavelength of the optical signal 300 can be located in one or multiple of the following bands: E—(1400~1470 nm), S—(1470~1520 nm), C—(1520~1565 nm), L—(1565~1630 nm) and U—(1630 nm~1680 nm) bands.

In this embodiment, the transmitting device 110 includes a plurality of transmitters 112, each transmitter 112 being configured to emit a given signal such that the plurality of emitted signals is combined by a multiplexer 114 operatively coupled to the optical link 105. For example and without limitation, each transmitter 112 may be a laser source of a respective wavelength and communicatively connected to a corresponding processing unit (not shown) of the transmitting device 110. The laser source may be configured to produce, emit, or radiate pulses of light with certain pulse duration. In certain embodiments, one or more transmitters 112 implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The multiplexer 114 may be a passive multiplexer such as, without limitation, a prism-based or a mirror-based multiplexer, or an active multiplexer based on a combination of passive components and tunable detectors, each detector being tuned to a specific frequency.

In this embodiment, the receiving device 120 includes a demultiplexer 124 operatively coupled to the optical link 105 and configured to receive the optical signal 300 to output a plurality of output signals, each output signal being further directed to a corresponding receiver 122 of the receiving device 120. For example, the demultiplexer 124 may be configured to output the output signals based on wavelength, such that each receiver 122 corresponds to one of the transmitters 112. Each pair of transmitter 112/receiver 122 ("Rx/Tx" pair) forms a channel of the optical link 105. As such the optical link 105 includes a plurality of channels.

In use, the demultiplexer 124 may separate the optical signal 300, comprising the plurality of wavelengths emitted by the plurality of transmitters 112, into its wavelength components. The demultiplexer 124 may be a passive multiplexer, such as without limitation a prism-based, diffraction grating-based, or spectral filter-based demultiplexer. In some embodiments, the demultiplexer 124 could be an active demultiplexer based on a combination of passive components and tunable detectors, each detector being tuned to a specific frequency. In this embodiment, the receivers 122 are photodiodes, each receiver 122 having its central wavelength corresponding to the wavelength emitted by its corresponding transmitter 112. For example, a transmitter 112 of a given Rx/Tx pair may emit a signal at a given wavelength, and the corresponding receiver 122 of the same given pair may be adapted to receive the signal at the given wavelength (e.g. relative higher responsivity for said wavelength). Other types of receivers 122 are contemplated in alternative embodiments.

As depicted, the optical link 105 includes a plurality of optical amplifiers 109 (e.g., erbium-doped fiber amplifiers (EDFAs)) placed in a sequence for amplifying the optical signal along the optical link 105. In this embodiment, the optical link 105 further includes Wavelength Selective Switches (WSSs) 126. The optical amplifiers 109 and the WSSs 126 are distributed along the optical link 105 to form Optical Multiplexing Sections (OMS) 202. Only two OMS 202 are depicted on FIG. 1, but this aspect is not limitative, the optical link 105 may include a different number of OMS 202. An OMS 202 is described in greater detail below with reference to FIG. 2.

Use of one or more additional optical network elements and modules (which may include either or both of active and passive elements/modules), such as, for example, optical filters, arrayed waveguide gratings, optical transmitting devices, optical receiving devices, processors and other suitable components along the optical link 105 is also contemplated in alternative embodiments.

Figure 2:
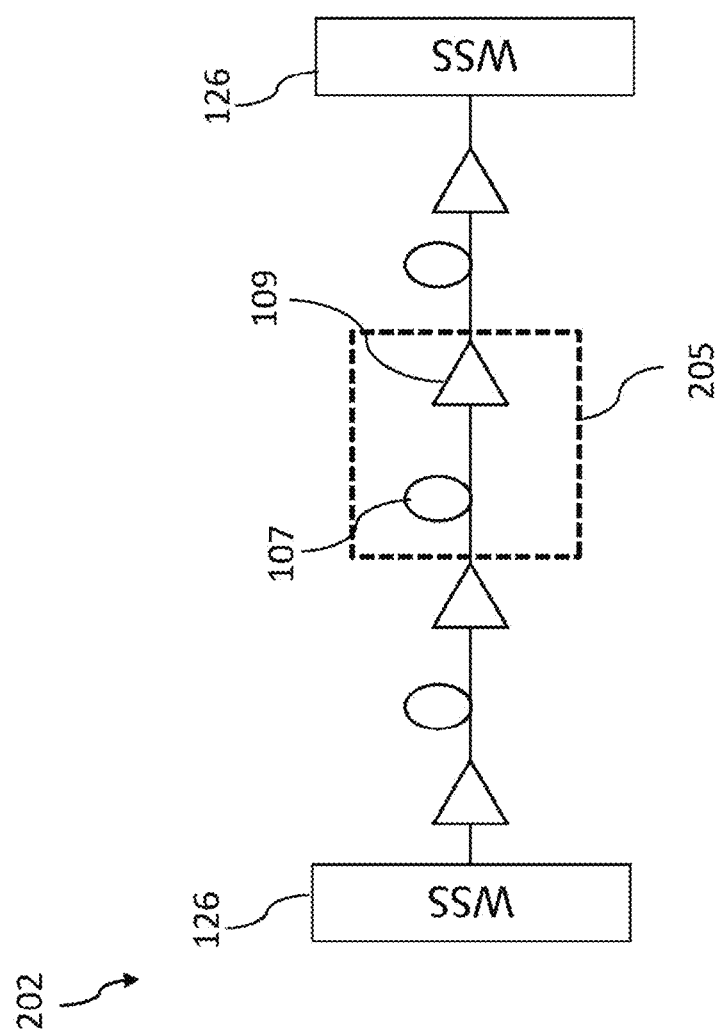
FIG. 2 is a high-level diagram of an optical multiplexing section (OMS) of the optical link of FIG. 1.

FIG. 2 is a high-level diagram of one of the optical multiplexing sections (OMS) 202. In this embodiment, the OMS 202 includes one or more spans 205. Each span 205 includes a portion 107 of optical communication line (e.g. optical fiber) and one of the optical amplifiers 109, said optical amplifier 109 receiving the optical signal 300 from the corresponding portion 107 of the same span 205. The portion 107 thus extends between two consecutive optical amplifier 109 along the optical link 105. It should be noted that definition of the span 205 is merely an illustrative definition to ease understanding of the present disclosure. For example, a span 205 may be differently defined by an optical amplifier 109 and the portion 107 that receives the optical signal 300 from said optical amplifier 109.

The span 205 may also be referred to an "optimization block", as improving performance of the optical link 105 is made by adjusting operational parameters of one or more of the spans 205. Said operational parameters are described in greater details herein after.

In the context of the present disclosure, optical noise, or simply "noise" or "noise level", of the optical signal 300 at a receiver 122 of the receiving device 120 is denoted:

$$n_{tot} = n_{TRx} + n_{ASE} + n_{NLI} + n_{others}, \quad (1)$$

where $n_{TRx}$ is the noise relative to the transmitter 112 (e.g. imperfect implementation), $n_{ASE}$ is the noise due to Amplified Spontaneous Emission that mostly occurs within the optical amplifiers 109, $n_{NLI}$ is the noise due to non-linearity effects (e.g. Kerr effect) that occurs along the optical link 105, and $n_{others}$ accounts for all the other sources of noise that may impact the optical signal 300. In multiple span systems, each span 205 may contribute to noise sources $n_{ASE}$, $n_{NLI}$ and $n_{others}$. In the context of the present disclosure, a noise value should be understood as a noise-to-signal ratio, or the signal power normalized noise, rather than absolute noise power values.

In addition, the denoted optical signal-to-noise (OSNR) ratio is the signal-to-noise ratio due to ASE noise $n_{ASE}$ while the generalized OSNR (gOSNR) includes both signal-to-noise ratio due to ASE and the contribution from nonlinear noise $n_{NLI}$. In other words, the gOSNR is the ratio of the optical signal 300 over the noise level $n_{ASE} + n_{NLI}$.

It should be noted that all the spans 205 may be adjusted in a same manner. As such, in the context of the present disclosure, adjustment of functional parameters of a given span 205 or components thereof is to be understood as being potentially applied to all the spans 205 of the optical link 105. Moreover, it should be noted that the ratios gOSNR/OSNR of a consecutive plurality of spans 205 may be properly added to determine a global ratio gOSNR/OSNR of the optical link 105.

Figure 3:
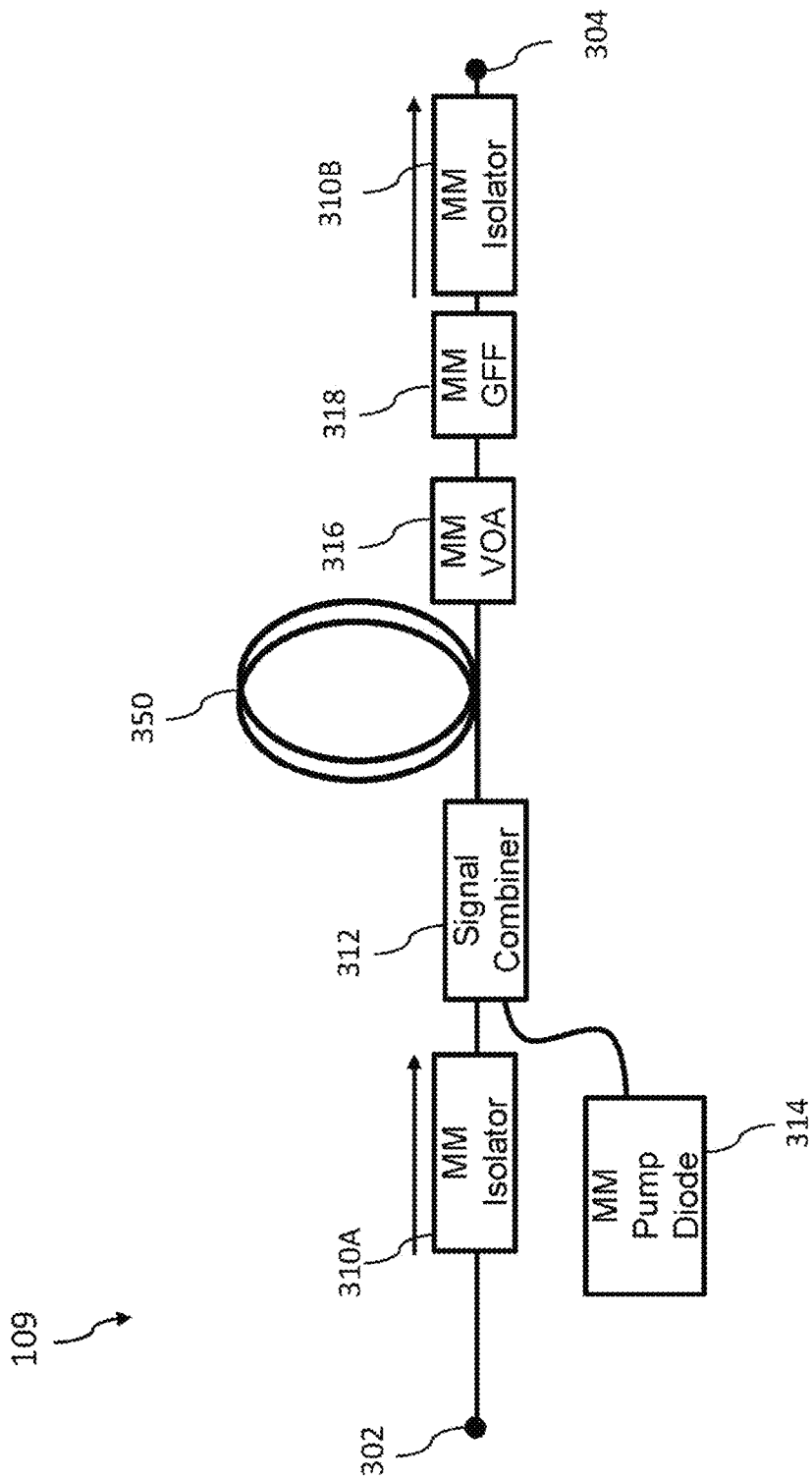
FIG. 3 is a schematic representation of an optical amplifier of the optical link of FIG. 1.

With reference to FIG. 3, there is illustrated one of the optical amplifiers 109 in accordance with non-limiting implementations of the present technology. The optical amplifier 109 includes an input 302 for receiving the optical signal 300 from an upstream span 205. The optical amplifier 109 further includes a signal combiner 312, a pump source 314 and a doped fiber 350. The optical amplifier 109 may be referred to as a "single stage" optical amplifier 109. The optical amplifier 109 may be a multi-stage optical amplifier including a plurality of pump sources such as pump source 214 associated with a plurality of signal combiners such as signal combiner 312.

The optical signal 300 to be amplified in the optical amplifier 109 is combined with a signal generated by the pump source 314, or "optical pump signal", by the signal combiner 312 and further injected in the doped fiber span 350. In other words, the optical signal 300 and the pump signal are multiplexed into the doped fiber span 350 such that the optical signal 300 is amplified through interaction with the doping ions. The pump source 314 may be, for example and without limitations, a laser diode. As a person skilled in the art would understand, amplification is achieved by stimulated emission of photons from dopant ions in the doped fiber span 350. The doped fiber further includes a multimode variable optical attenuator (VOA) 516 at an output of the first span 250A of doped fiber 250 and a gain flattening filter (GFF) 518 directly downstream the VOA 516. The VOA 516 may support propagation of multimode optical signals and be used for adjusting a global gain level of the two-stage optical amplifier 500 by attenuating the multimode optical signal 300 propagating therein. The GFF 518 may be used to equalize optical power of wavelength division multiplexing signals, such as the multimode optical signal 300 in case multimode optical signal 300 is not a monochromatic optical signal. In this implementation, propagation of the multimode optical signal 300 between the first span 250A and the second span 250B of doped fiber 250 is operated over a passive multimode optical fiber (MMF) such as the waveguide span 107. The doped fiber span 350 is doped with rare-earth ions such as erbium, ytterbium, neodymium, thulium, praseodymium, and/or holmium ions. The pump signal excites ions into a higher energy from where they further decay via stimulated emission of a photon at a wavelength of the optical signal 300 back to a lower energy level, where they may be further excited by the pump signal such that the optical signal 300 is amplified in a continuous manner. It should be noted that each spatial mode of the optical signal 300 is amplified with a corresponding gain (i.e. a corresponding amplification).

The optical amplifier 109 further includes an output 304 for transmitting the amplified optical signal 300 to a downstream waveguide span 205. In this implementation, the optical amplifier 109 further includes a first isolator 310A at the input 302 and a second isolator 310B at the output 304 to prevent feedbacks of the optical signal 300 from occurring.

Figure 4:
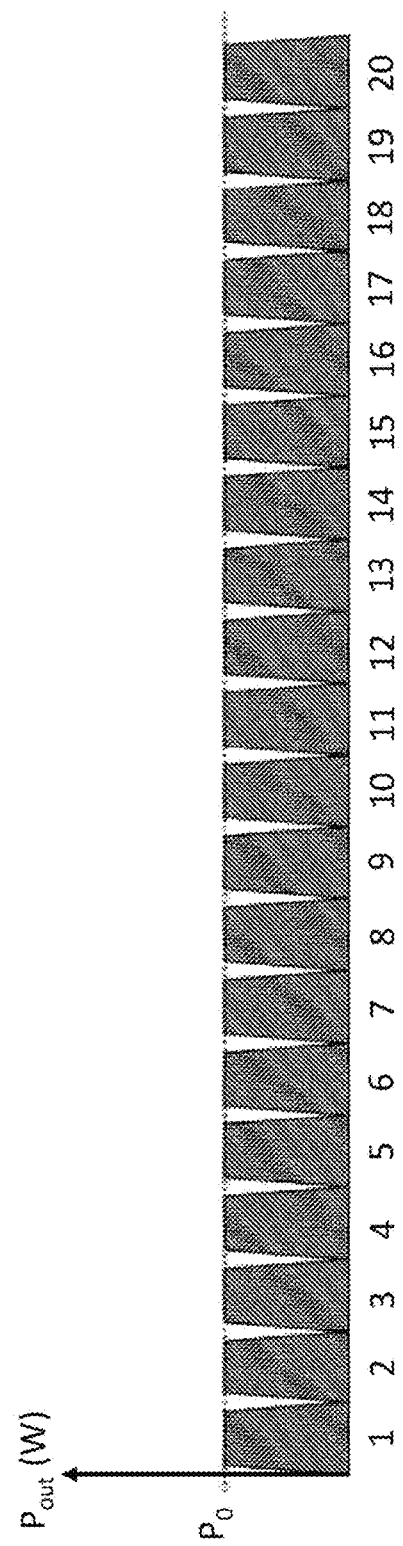
FIG. 4 is a representation of optical launch power values of channels of an optical communication line equalized as described in some references found in the prior art.

FIG. 4 is an example representation of optical launch power values of channels of an optical communication line equalized as described in some references found in the prior art. More specifically, there is illustrated optical power values of twenty (20) channels at an input of the OMS 202.

Said optical power values may thus be referred to as "optical launch power values" as the optical power of the optical signal exiting an optical amplifier is the optical power of the optical signal entering a following span of the optical communication line. In other words, the optical launch power values of the optical signal at a given span of the optical communication line corresponds to output power values of a directly preceding span of the optical communication line. For simplicity on FIG. 4, the optical launch power value of every channel is assumed to a same value Po. In practice, the launch power profile may not necessarily be flat, it may have whatever shape after OSNR or gOSNR equalization for a given OMS.

However, such an equalization of the optical launch power values does not take into consideration differences of performance of the Rx/Tx pairs. An aspect of the present disclosure is to take said differences into consideration to improve overall performance of the optical communication line (e.g. the optical link 105). Indeed, some transmitters may have higher performances than others, thus having a lower $n_{TRx}$. From the link budget point of view, for the relatively worse transmitters (i.e. higher $n_{TRX}$), lower values of gONSR (or 1/gOSNR) on the corresponding channel can be tolerated. Lower link gONSR means reduced transmission distance.

As will be described in greater details herein after, for those channels with relatively low performance that may be due to poor transmitter/receiver performances (or higher impairments from sources other than ASE/NLI on the optical link 105), their corresponding values gONSRs may be adjusted to be lower than the conventionally achieved flat gONSR that is shown on FIG. 4.

Referring back to FIG. 1, there is illustrated a performance adjusting system 400 implemented on the optical link 105 in accordance with embodiments of the present technology. In this embodiment, the performance adjusting system 400 includes a controller 410 communicably connected to the receiving device 120. More specifically, the controller 410 is communicably connected to each of the receivers 122 and receive communication data therefrom. Said communication data includes information about signals received by the receivers 122. The controller 410 further determines performances of the Rx/Tx pairs based on the communication data. For example, the controller 410 may determine, for each channel of the optical link 105 (i.e. for each Rx/Tx pair), a value of the gOSNR and a value of the OSNR using techniques and/or algorithms known in the art of optical communication.

In this embodiment, the controller 410 and the receivers 122 are communicatively connected via any wired or wireless communication link including, for example, Dynamic Circuit Network (DCN), or any other suitable connection. In some non-limiting implementations of the present technology, said suitable connection may be implemented as the Internet. In other implementations of the present technology, said connection can be implemented differently, such as any wide-area communication network, local-area communication network, a private communication network and the like. How the communication between the controller 410 and the receiving device 120 is implemented will depend inter alia on how the controller 410 and the receiving device 120 are implemented.

Additionally, the controller 410 is operably connected to the OMSs 202 of the optical link 105. More specifically, the controller 410 is operably connected to components of the OMSs 202 such as the WSS 126. The controller 410 may thus, in use, adjust operational parameters of the OMSs 202.

Said operational parameters may be, for example and without limitation, an attenuation function of the WSS 126 in order to selectively adjust optical launch power values for one or more of the channels of the optical link 105. In this embodiment, the controller 410 is a link controller of the optical link 105 that is already present in the optical link 105.

In this embodiment, the controller 410 and the OMSs 202 are operably connected via any wired or wireless communication link including, for example, 4G, LTE, Wi-Fi, or any other suitable connection. For example, the controller 410 may transmit instructions to the OMSs 202 that will be further executed by the WSS 126. How the communication between the controller 410 and the OMSs 202 is implemented will depend inter alia on how the controller 410 and the OMSs 202 are implemented.

Figure 5:
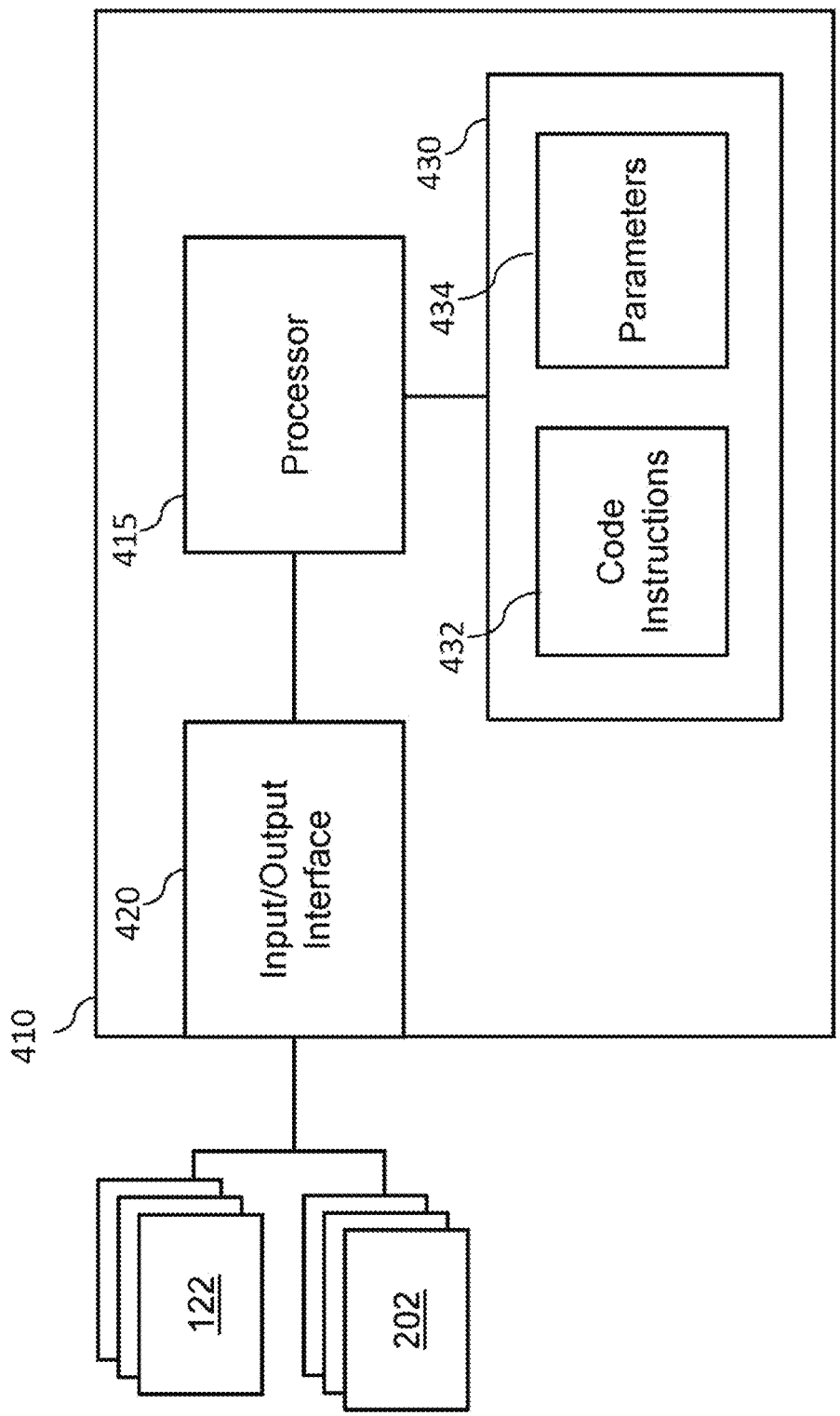
FIG. 5 is block diagram of a controller of the system of FIG. 6 in accordance with an embodiment of the present technology.

As an example, FIG. 5 is a schematic block diagram of the controller 410 of the performance adjusting system 400 according to an embodiment of the present technology. The controller 410 includes a processor or a plurality of cooperating processors (represented as a processor 415 for simplicity), a memory device or a plurality of memory devices (represented as a memory device 430 for simplicity), and an input/output interface 420 allowing the controller 410 to communicate with other components of the performance adjusting system 400 and/or other components in remote communication with the performance adjusting system 400. The processor 415 is operatively connected to the memory device 430 and to the input/output interface 420. The memory device 430 includes a storage for storing parameters 434, including for example and without limitation the above-mentioned pre-determined OSNR threshold and/or gOSNR threshold. The memory device 430 may include a non-transitory computer-readable medium for storing code instructions 432 that are executable by the processor 415 to allow the controller 410 to perform the various tasks allocated to the controller 410 in the methods described in the present disclosure.

Figure 6:
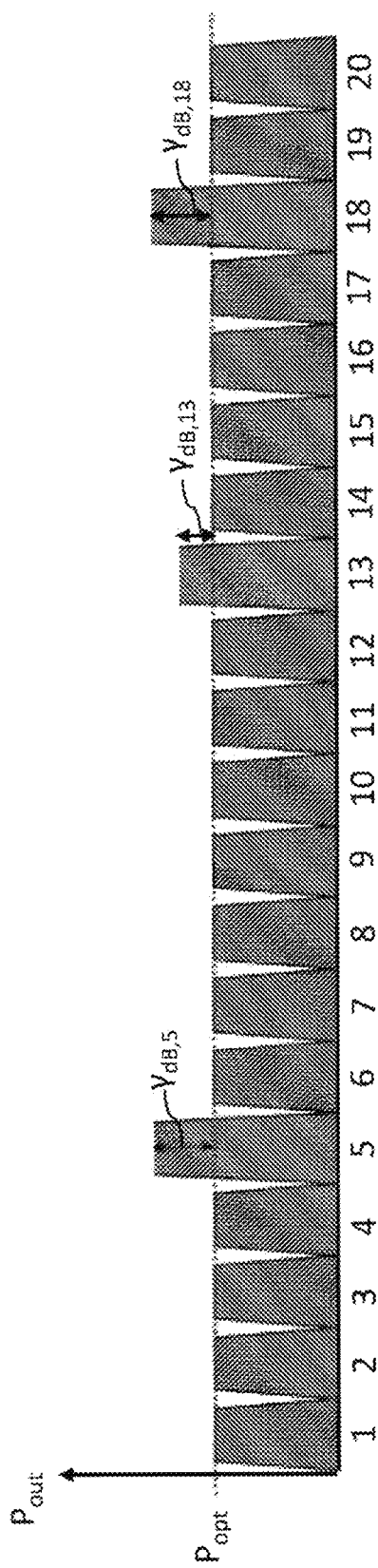
FIG. 6 is a representation of optical launch power values of channels of the optical link of FIG. 1 adjusted in accordance with some embodiments of the present technology.

The controller 410 is operatively connected, via the input/output interface 420, to the receivers 122 of the receiving device 120, and to the OMS 202 (i.e. the WSS 126 thereof). The controller 410 executes the code instructions 432 stored in the memory device 430 to implement the various functions described herein that may be present in a particular embodiment. FIG. 6 as illustrated represents a non-limiting embodiment in which the controller 410 orchestrates operations of the performance adjusting system 400. This particular embodiment is not meant to limit the present disclosure and is provided for illustration purposes.

In use, the controller 410 receives the communication data from the receiving device 120 and determines a noise level $n_{tot}$ of at least one channel of the optical link 105. In this embodiment, the controller 410 determines a noise level of every channel. As previously discussed, the optical amplifiers 109 and portions 107 contribute to the noise level. In multiple span system such as the optical link 105, it is assumed that the adjustment of the optical launch power of each span 205 can be done independently (the nonlinear noise correlation between different transmission fiber spans can be neglected). The total noise level $n_{tot}$ is thus the sum of all the constituting spans 205. The following part of the disclosure thus discuss improvement of the performance of one span 205 of the optical link 105 for ease of understanding. It is contemplated that the performance improvement methods described herein could be applied to a plurality of spans 205, including all of the spans 205 of the optical link 105.

The noise $n_{tot}^{span}$ generated in a given span 205, or "optimization block" 205, includes the fiber nonlinear noise of the portion 107 and the ASE noise of the optical amplifier 109. For a given channel, the fiber nonlinear noise is proportional to the launch power squared ($P^2$) of said channel entering the span 205, with scaling factor $k_1$. The nonlinear scaling factor $k_1$ depends on the fiber characteristics of the optical link 105 (type, loss etc.), channel loading condition (e.g. a number of channels included in the optical link 105, wavelengths of the channels, etc.), as well as a format of the optical signal 300, baud rate, etc. The ASE noise is inversely proportional to the optical power P/portionloss received at the optical amplifier 109, where "portionloss" (the loss between the transmission fiber input and the downstream amplifier input) accounts for loss of power affecting the optical signal 300 during propagation thereof in the portion 107 preceding the optical amplifier 109 in the span 205, with scaling factor $k_2$. The total noise $n_{tot}^{span}$ in generated in the span 205 can thus be written:

$$n_{tot}^{span} = k_1 P^2 + k_2 \frac{NF}{P/portionloss}, \quad (2)$$

where NF is the noise figure of the optical amplifier 109 of the span 205.

There exists an optimal power $P_{opt}$ that gives a first reduced value $n_{tot}^{span}$:

$$P_{opt} = \left(\frac{k_2 \times portionloss \times NF}{2k_1}\right)^{1/3}. \quad (3)$$

The first reduced value of no is thus:

$$n_{tot,reduced\ 1}^{span} = 3k_1 P_{opt}^2. \quad (4)$$

As described with respect to FIG. 4, the optical launch power value of every channel is equalized to the same value Po that may be equal to $P_{opt}$. In practice, due to different noise figure NF, and different nonlinear noise coefficient factor $k_1$, the optimal launch power may be different for different channels. However, the optimal launch power profile will be a smooth over channels. This optimal launch power profile will be our reference ("flat"). The present technology relates to channel power deviation from this reference ("flat") optimal power profile.

However, an aspect of the present technology is to take into consideration differences of performance between the channels and effect of said differences on the overall performance of the optical link 105. The first reduced value $n_{tot,reduced\ 1}^{span}$ has been determined under the assumption that the channels have identical performances and that channels are independent from one another. For a given low-performing channel, also referred to as a "channel of interest" (COI), there exists another power value that further minimizes its total noise in the span 205.

Indeed, the nonlinear noise $n_{NLI}$ includes self-phase modulation noise (SPM), and cross-phase modulating noise (XPM). However, increase of the optical power P in the COI leads to increasing the SPM only while the XPM noise stays unchanged. In the context of the present disclosure, p denotes the ratio of SPM noise over the total nonlinear noise $n_{NLI}$, $n_{NLI}$ being equal to the sum of the SPM noise and the XPM noise. In the following equations, $\gamma$ is a factor by which the optical power P entering the span 205 is increased. The total noise $n_{tot}^{span}$ may be re-written as:

$$n_{tot}^{span} = (1-\beta)k_1 P_{opt}^2 + \beta k_1 \gamma^2 P_{opt}^2 + \frac{k_2 NF \times G}{\gamma P_{opt}}, \quad (5)$$

where G is a gain and accounts for the loss along the portion 107 of the span 205.

There exists a second optimal power $P_{opt,2}$ for $\gamma = \beta^{-1/3}$ that gives a second reduced value of $n_{tot}^{span}$:

$$n_{tot,reduced2}^{span} = (1-\beta)k_1 P_{opt}^2 + \beta^{\frac{1}{3}}\left(k_1 P_{opt}^2 + \frac{k_2 NF \times G}{P_{opt}}\right) \quad (6)$$

$$= 3k_1 P_{opt}^2 \left(\frac{1-\beta}{3} + \beta^{\frac{1}{3}}\right).$$

The second reduced value $n_{tot,reduced\ 2}^{span}$ may be referred to as a desired reduced noise. The ratio of the optical signal over the second reduced value $n_{tot,reduced\ 2}^{span}$ may thus be referred to as a desired generalized Optical Signal-to-Noise Ratio (desired gOSNR).

FIG. 6 is a representation of optical launch power values of channels of the optical link 105 adjusted in accordance with some embodiments of the present technology. In this embodiment, the controller 410 determines the noise level for each channel of the optical link 105. More specifically, the controller 410 determines a SPM noise and a XPM noise for each channel, thereby determining a value $\gamma$ for each channel that minimizes the noise level of each channel of the optical link 105. For example, the controller 410 may identify one or more low performing channels with low performing transmitters 112. Said low performing channel may be identified, for example and without limitation, in response to the controller 410 determining that their corresponding noise level is above a pre-determined noise threshold.

In the example shown on FIG. 6, the fifth, thirteenth and eighteenth channels are low performing channels, and the controller 410 causes adjustment of the operational parameters of the OMS 202 to increase an optical power of said three channels at the WSS 126. More generally, in response to determining low performance channels, the controller 410 performs link commissioning. By doing so, the controller 410 causes adjustment of the attenuation function of the WSS 126 (i.e. channel loss at the WSS, or "WSS channel loss") applied to the optical signals carried by the low performing channels by adjusting operational parameters of the OMSs 202. In this embodiment, the controller 410 adjusts said WSS channel loss by increasing optical launch power values for the low performing channels by the corresponding determined value $\gamma$ (in dB).

In the illustrative example of FIG. 6, the optical launch power value of the fifth channel is increased by a corresponding value $\gamma_{dB,5}$ with respect to $P_{opt}$ determined based on SPM noise and XPM noise measured at the fifth channel. Similarly, the optical launch power value of the thirteenth channel is increased by a corresponding value $\gamma_{dB,13}$ with respect to $P_{opt}$ determined based on SPM noise and XPM noise measured at the thirteenth channel, and the optical launch power value of the eighteenth channel is increased by a corresponding value $\gamma_{dB,18}$ with respect to $P_{opt}$ determined based on SPM noise and XPM noise measured at the eighteenth channel.

Given equations (4) and (6), the gOSNR is reduced compared to the scenario where the optical launch power of every channel is equalized at $P_{opt}$, by the following value:

$$\Delta gOSNR_{dB} = 10 \log_{10}\left(\frac{1-\beta}{3} + \beta^{\frac{1}{3}}\right). \quad (7)$$

Figure 7:
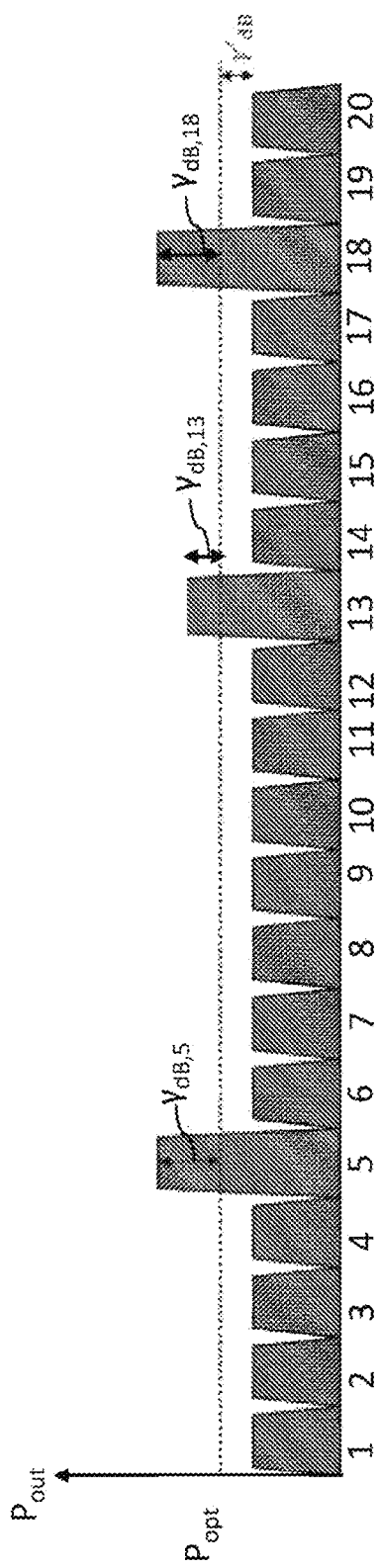
FIG. 7 is a representation of optical launch power values of channels of the optical link of FIG. 1 adjusted in accordance with some other embodiments of the present technology.

In the same or another embodiment, optical launch power value of channels other that the COIs could also be adjusted by the controller 410. Indeed, the above calculation assumes all channel other than COI are set to optimal power. To allow more improvement room for the COIs, the optical launch power value of other channels may be reduced by a given offset value $\gamma_{dB}'$ (in dB). As a consequence, such a power reduction may lead to reduced gOSNR for other channels. It should be noted that the gOSNR reduction may not be substantial. FIG. 7 is a representation of optical launch power values of channels of the optical link 105 where the optical launch values of the COIs are increased by their corresponding γ values (in dB), and the optical launch values of the other channels of the optical link 105 are decreased by $\gamma_{dB}'$ (in dB).

Figure 8:
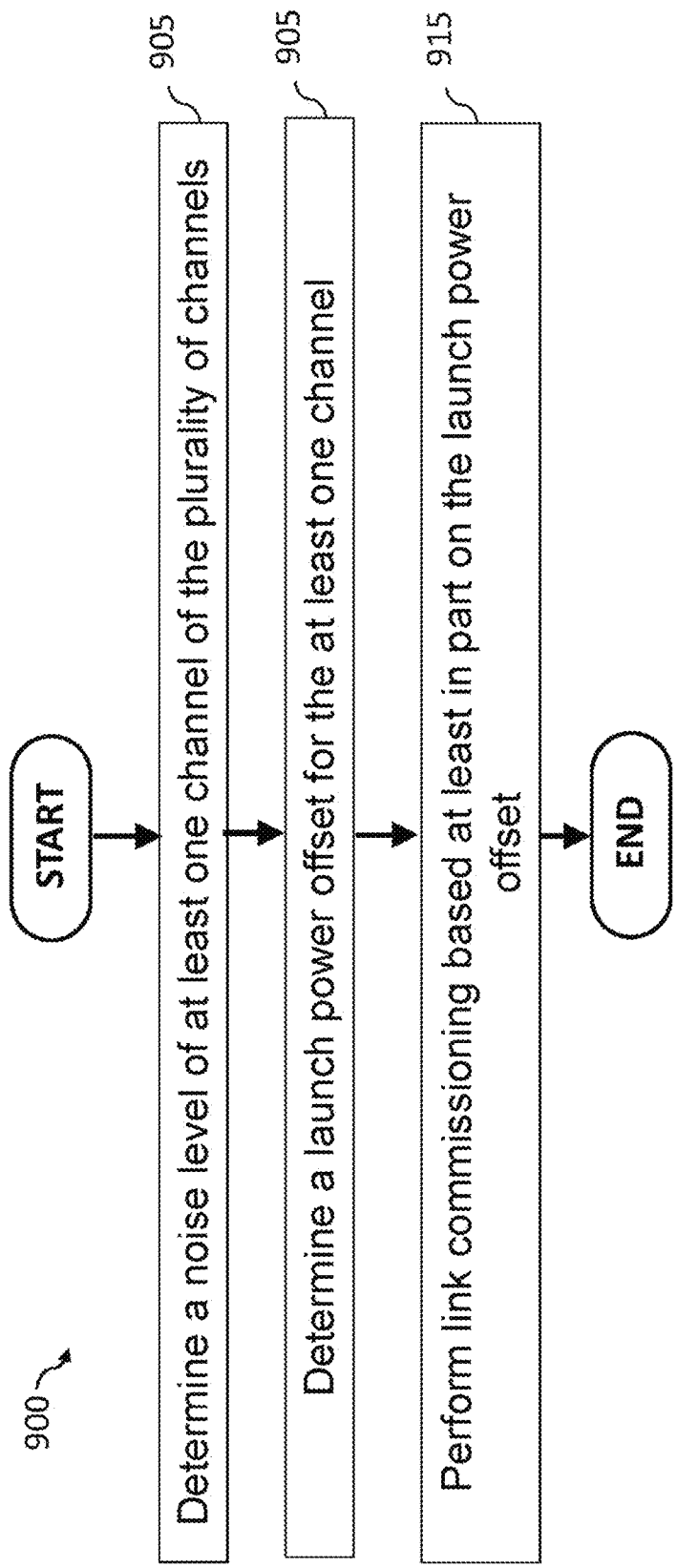
FIG. 8 is a flow diagram showing operations of a method for improving performance of the optical link of FIG. 1 in accordance with some embodiments of the present technology.

With reference to FIG. 8, a method 900 for improving performance in an optical link 105 is illustrated in the form of a flowchart. In one or more aspects, the method 900 is performed by the link controller 410 or any other device that may be communicably and operably connected to the optical link 105. In some implementations, one or more operations of the method 900 could be implemented, in whole or in part, by another computer-implemented device. It is also contemplated that the method 900 or one or more operation thereof may be embodied in computer-executable instructions that are stored in a computer-readable medium, such as a non-transitory mass storage device, loaded into memory and executed by a processor, such as the controller 410. Some operations or portions of operations in the flow diagram may be possibly being executed concurrently, omitted or changed in order.

The method 900 begins with determining, at operation 905, a noise level of at least one channel of the plurality of channels of the optical link 105. In this embodiment, the controller 410 determines, for each channel of the optical link 105, the noise level $n_{tot}$, and more particularly the present generalized Optical Signal-to-Noise Ratio (gOSNR), and the Optical Signal-to-Noise ratio (OSNR). It should be noted that the present gOSNR takes into consideration the self phase modulation (SPM) and cross phase modulation (XPM) effects.

The method 900 continues with determining, at operation 910, a launch power offset for the at least one channel. In this embodiment, the controller 410 determines noise ratio (β) for each channel, where:

$$\beta = \frac{SPM}{(SPM + XPM)},$$

SPM being a self-phase modulation (SPM) noise value and XPM being a cross phase modulation (XPM) noise value.

In this embodiment, the controller 410 determines the noise ratio β for channels identified as having a noise level above a pre-determined threshold, said channels being referred to as channels of interest (COIs). The pre-determined threshold may be a fixed value, or may be based on noise levels of the channels (e.g. an average or a median thereof).

The controller 410 further determines a launch power offset $\gamma = \beta^{-1/3}$ for each of the COIs. The controller 410 further causes the OMSs 202 to adjust an attenuation function of one or more of the WSS 126 such that an optical power of optical signal 300 in the COIs is offset by the launch power offset.

The method 900 ends with performing, at operation 915, link commissioning based at least in part on the launch power offset. The controller 410 causes adjustment of the optical gains in the optimization blocks 205 such that optical launch power values of the COI are offset by the launch power offset γ. In this example, the controller 410 causes reduction of the attenuation function of the WSS 126 in order to selectively increase optical launch power values for the COIs (i.e. increasing a gain at the corresponding wavelengths). In some embodiments, the controller 410 further causes the optical launch power values of the channels that are not identified as COIs to be reduced by a pre-determined value $\gamma_{dB}'$ by increasing the attenuation function of the WSS 126 for channels that are not identified as COIs. In some embodiments, propagation of the optical signal 300 may be reinitiated once the controller 410 has performed the link commissioning.

It will be appreciated that at least some of the operations of the method 900 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It is to be understood that the operations and functionality of the described performance adjusting system 400, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for improving performance in an optical link, the optical link comprising a plurality of communication channels for transmitting an optical signal, the method being performed by a link controller of the optical link, the method comprising:
   determining a noise level of at least one channel of the plurality of channels, determining the noise level comprising determining a noise ratio (B):

$$\beta = \frac{SPM}{(SPM + XPM)},$$

SPM being a self-phase modulation noise value and XPM being a cross phase modulation noise value;
   determining a launch power offset for the at least one channel, determining the launch power offset comprising:

$$\gamma = \beta^{-1/2}$$

γ being the launch power offset; and
   performing link commissioning based at least in part on the launch power offset.

2. The method of claim 1, wherein determining noise of at least one channel comprises:
   determining, for each channel, a present Optical Signal-to-Noise Ratio and a desired Optical Signal-to-Noise Ratio.

3. The method of claim 2, wherein determining the present Optical Signal-to-Noise Ratio is based on self phase modulation (SPM) and cross phase modulation (XPM) effects.

4. The method of claim 1, wherein the optical link comprises at least one Wavelength Selective Switches (WSS) having a corresponding attenuation function applied to the optical signal, and performing link commissioning comprises:
   adjusting the attenuation function of the at least one WSS such that an optical power of the optical signal in the at least one channel is offset by the launch power offset.

5. The method of claim 4, wherein adjusting an attenuation function of the at least one WSS comprises:
   changing a value of an optical loss corresponding to the at least one channel.

6. The method of claim 5, wherein the at least one channel comprises a plurality of channels and adjusting an attenuation function of the at least one WSS comprises:
   augmenting a value of an optical loss corresponding to the at least one channel and/or reducing a value of optical losses corresponding to the channels of the plurality of channels.

7. The method of claim 1 further comprising reinitiating a propagation of the optical signal in the at least one channel.

8. The method of claim 1, wherein determining the at least one channel comprises:
   determining one or more channels having a respective noise value above a pre-determined threshold; and
   identifying the one or more channels as the at least one channel.

9. A system for improving performance in an optical link, the optical link comprising a plurality of communication channels for transmitting an optical signal, the system comprising a link controller operably connected to the optical link, the link controller being configured to:
   determine a noise level of at least one channel of the plurality of channels, determining the noise level comprising determining a noise ratio (β):

$$\beta = \frac{SPM}{(SPM + XPM)},$$

SPM being a self-phase modulation noise value and XPM being a cross phase modulation noise value;
   determine a launch power offset for the at least one channel, determining the launch power offset comprising:

$$\gamma = \beta^{-1/2}$$

γ being the launch power offset; and
   perform link commissioning based at least in part on the launch power offset.

10. The system of claim 9, wherein the link controller is further configured to, in order to determine noise of at least one channel:
   determine, for each channel, a present Optical Signal-to-Noise Ratio and a desired Optical Signal-to-Noise Ratio.

11. The system of claim 10, wherein the link controller is further configured to, in order to determine the present Optical Signal-to-Noise Ratio, determine self phase modulation (SPM) and cross phase modulation (XPM) effects.

12. The system of claim 9, wherein the optical link comprises at least one Wavelength Selective Switches (WSS) having a corresponding attenuation function applied to the optical signal, and the link controller performs link commissioning by:
   adjusting the attenuation function of the at least one WSS such that an optical power of optical signal in the at least one channel is offset by the launch power offset.

13. The system of claim 12, wherein the link controller adjusts an attenuation function of the at least one WSS by:
   changing a value of an optical loss corresponding to the at least one channel.

14. The system of claim 13, wherein the at least one channel comprises a plurality of channels and the link controller adjusts an attenuation function of the at least one WSS by:
   augmenting a value of a loss corresponding to the at least one channel and/or reducing the values of losses corresponding to the channels of the plurality of channels.

15. The system of claim 9, wherein the link controller is further configured to reinitiate a propagation of the optical signal in the at least one channel.

16. The system of claim 9, wherein the link controller determines the at least one channel by:
   determining one or more channels having a respective noise value above a pre-determined threshold; and
   identifying the one or more channels as the at least one channel.

* * * * *

UNITED STATES PATENT AND TRADEMARK OFFICE
CERTIFICATE OF CORRECTION

| | | |
|---|---|---|
| PATENT NO. | : 12,088,338 B2 | Page 1 of 1 |
| APPLICATION NO. | : 17/952042 | |
| DATED | : September 10, 2024 | |
| INVENTOR(S) | : Zhiping Jiang | |

It is certified that error appears in the above-identified patent and that said Letters Patent is hereby corrected as shown below:

In the Claims

In Column 15, Line 9, Claim 1, "noise ratio (B)" should read --noise ratio ($\beta$)--

Signed and Sealed this
Fifteenth Day of October, 2024

Katherine Kelly Vidal
*Director of the United States Patent and Trademark Office*